(12) United States Patent
Forgione et al.

(10) Patent No.: US 9,376,527 B2
(45) Date of Patent: Jun. 28, 2016

(54) FLUORINATED POLYURETHANE COMPOSITION

(75) Inventors: Gerardo Forgione, Alassio (IT); Sara Rovinetti, Bologna (IT); Marco Beltramin, Senago (IT)

(73) Assignee: SOLVAY SPECIALTY POLYMERS ITALY S.P.A., Bollate (Milano) (IT)

( * ) Notice: Subject to any disclaimer, the term of this patent is extended or adjusted under 35 U.S.C. 154(b) by 371 days.

(21) Appl. No.: 13/641,561

(22) PCT Filed: Apr. 14, 2011

(86) PCT No.: PCT/EP2011/055876
§ 371 (c)(1),
(2), (4) Date: Oct. 16, 2012

(87) PCT Pub. No.: WO2011/131547
PCT Pub. Date: Oct. 27, 2011

(65) Prior Publication Data
US 2013/0041089 A1 Feb. 14, 2013

(30) Foreign Application Priority Data
Apr. 21, 2010 (EP) .................................. 10160615

(51) Int. Cl.
*E04D 1/00* (2006.01)
*C08L 53/00* (2006.01)
*C08G 18/50* (2006.01)
(Continued)

(52) U.S. Cl.
CPC ........ *C08G 18/5015* (2013.01); *C08G 18/0804* (2013.01); *C08G 18/0819* (2013.01); *C08G 18/0823* (2013.01); *C08G 18/6692* (2013.01)

(58) Field of Classification Search
None
See application file for complete search history.

(56) References Cited
U.S. PATENT DOCUMENTS

| | | | |
|---|---|---|---|
| 2,803,615 A | 8/1957 | Ahlbrecht et al. |
| 2,995,542 A | 8/1961 | Brown |
| 3,242,218 A | 3/1966 | Miller |

(Continued)

FOREIGN PATENT DOCUMENTS

| | | | |
|---|---|---|---|
| EP | 0239123 A2 | 9/1987 |
| EP | 1369442 A1 | 12/2003 |

(Continued)

OTHER PUBLICATIONS

Temtchenko, T., et al—"New developments in perfluoropolyether resins technology: high solid and durable polyurethanes for heavy duty and clear OEM coatings", 2001, Progress in Organic Coatings, vol. 43, Issue Nos. 1-3, Elsevier Science B.V., pp. 75-84; 10 pgs.

(Continued)

*Primary Examiner* — Susannah Chung
*Assistant Examiner* — Robert T Butcher

(57) ABSTRACT

An aqueous composition comprising:
(A) at least one functional fluorinated polymer [polymer (F)] selected from:
  a fluorinated ionizable polyurethane polymer [polymer (PUR)] comprising at least one fluorinated block comprising a (per)fluoropolyoxyalkylene chain [chain $(R_{OF})$] and at least one functional block comprising a hydrocarbon chain [chain $(R_H)$] optionally comprising one or more aromatic or cycloaliphatic groups, said chain $(R_H)$ comprising at least one ionizable group, said blocks being linked by urethane moieties having formula (I) wherein E is a divalent hydrocarbon group, linear or branched, optionally comprising one or more cycloaliphatic or aromatic groups, and
  a fluorinated polymer [polymer (P)] comprising one or more perfluoroalkyl chains [chain $(R_F)$] linked by one or more ester moieties having formula (II) and/or urethane moieties having formula (III) and/or urea moieties having formula (IV)
(B) at least one functional hydrogenated polymer [polymer (H)] different from said polymer (F), said polymer (H) comprising at least one functional group;
(C) at least one cross-linking agent;
wherein the weight ratio of the polymer (F) to the polymer (H) is higher than 0.75.

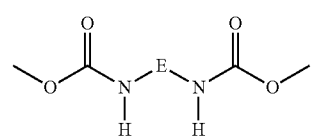

formula (I)

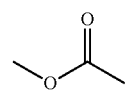

formula (II)

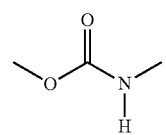

formula (III)

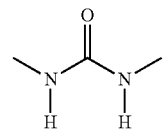

formula (IV)

8 Claims, No Drawings

(51) Int. Cl.
*C08G 18/08* (2006.01)
*C08G 18/66* (2006.01)

(56) References Cited

U.S. PATENT DOCUMENTS

| | | |
|---|---|---|
| 3,356,628 A | 12/1967 | Smith et al. |
| 3,715,378 A | 2/1973 | Sianesi et al. |
| 4,525,423 A | 6/1985 | Lynn et al. |
| 4,529,658 A | 7/1985 | Schwartz et al. |
| 4,983,666 A | 1/1991 | Zavatteri et al. |
| 5,149,842 A | 9/1992 | Sianesi et al. |
| 5,258,110 A | 11/1993 | Sianesi et al. |
| 5,959,058 A | 9/1999 | Tonelli et al. |
| 7,323,084 B2 | 1/2008 | Turri et al. |
| 7,323,435 B1 | 1/2008 | Turri et al. |

FOREIGN PATENT DOCUMENTS

| | | |
|---|---|---|
| EP | 1559733 A1 | 8/2005 |
| GB | 1104482 A | 2/1968 |
| WO | WO 9610595 A1 | 4/1996 |
| WO | WO 2008138927 A1 | 11/2008 |

OTHER PUBLICATIONS

Stadler, Rupert, et al—"PUR tidiness: aqueous fluoro-modified polyurethane system for permanent anti-graffiti and anti-soiling coating", 2003, Farbe + Lack, vol. 109, Issue No. 2, pp. 36, 38-41; 6 pgs, Includes abstract in English.

FLUORINATED POLYURETHANE COMPOSITION

CROSS-REFERENCE TO RELATED APPLICATIONS

This application is a U.S. national stage entry under 35 U.S.C. §371 of International Application No. PCT/EP2011/055876 filed Apr. 14, 2011, which claims priority to European application No. 10160615.0 filed Apr. 21, 2010, the whole content of this application being incorporated herein by reference for all purposes.

TECHNICAL FIELD

The present invention relates to a fluorinated polyurethane composition, to a process for the manufacture of said composition, to use of said composition for coating a substrate and to coated substrates.

BACKGROUND ART

Aqueous dispersion of ionomeric polyurethanes having a (per)fluoropolyether structure for use as coatings are known. These compounds can crosslink in a wide range of temperature, from 10° C. to 200° C., and provide for durable coatings.

Thus, EP 1369442 A (SOLVAY SOLEXIS S.P.A.) Oct. 12, 2003 discloses aqueous dispersions of ionomeric polyurethanes having (per)fluoropolyether structures with cross-linking agents which, when applied to various substrates, provide for cross-linked coatings endowed with high water and solvent resistance properties, low friction coefficients and anti-graffiti properties.

Moreover, WO 96/10595 (MINNESOTA MINING AND MANUFACTURING COMPANY) Nov. 4, 1996 discloses a two-part water-based composition prepared by mixing two aqueous compositions, one of them comprising a polyurethane prepolymer, said prepolymer optionally containing a segment notably selected from fluorinated-polyether diol segments and having both carboxylic acid and hydroxyl functional groups in an amount such that the acid number of the prepolymer ranges from about 10 to 100 and the average hydroxyl functionality of the prepolymer ranges from about 1.85 to 2.7, and, optionally, one or more acrylic polymers, the other comprising a cross-linking agent selected from polyisocyanates, blocked polyisocyanates and mixtures thereof. The final composition obtained upon cure exhibits high damping character and excellent scratch-resistance, mar-resistance and self-healing properties to be used as a coating. However, no mention is made therein of use of said cured composition as a decorative and protective coating.

A decorative coating is typically used for protecting architectural surfaces, in particular interior and/or exterior surfaces of buildings and surfaces of other physical structures notably including urban furniture, and interior and/or exterior surfaces of public transports.

Demand for protective coatings is still growing in the architectural field, wherein architectural surfaces, typically exposed to aggressive atmospheric pollutants and weather conditions, necessitate a long-lasting protection.

Masonry is commonly used for the walls of buildings, retaining walls and monuments. Bricks and concrete blocks are the most common types of masonry typically used. Extreme weather causes degradation of masonry surfaces due to frost damage. Moreover, masonry surfaces, because of their susceptibility to moisture absorption and retention, need to be protected to withstand the effects of corrosion, in particular in the case of reinforced concrete structures wherein the embedded steel reinforcing bars are typically corroded. Protective coatings are thus required which enable retaining durability of the overall masonry construction and breathability thereof in allowing trapped moisture to escape outside the coated surface while preventing more moisture from entering.

As graffiti paints also represent a major and increasing danger to buildings and heritage monuments made up of stones, bricks and mortars other than to public transports, protective coatings are particularly demanded which are further suitable for protecting surfaces against graffiti markings.

Anti-graffiti coatings may be classified into sacrificial and semi-sacrificial coatings, which are applied to a surface and then removed taking the graffiti with them, and permanent coatings, which prevent graffiti paints from adhering to a surface.

A sacrificial coating forms a clear coat barrier over the wall or surface being protected. If the surface is vandalized, the coating can be removed using a high-pressure washer taking the graffiti with it. The coating then must be reapplied. The materials used to make a sacrificial coating are usually optically clear polymers such as acrylates, biopolymers and waxes. These polymers form weak bonds with the substrate to allow for easy removal. A semi-sacrificial coating known as a safety shield acts as a penetrating sealer on the wall or surface protecting the surface pores. If the surface is vandalized, the coating can be removed using a combination of graffiti remover and high-pressure washer. The anti-graffiti safety shield is generally reapplied.

Permanent coatings work by creating a protective surface which makes graffiti paints unable to adhere to the surface. After the surface has been vandalized, the graffiti paint is typically removed by a specific remover. The underlying surface and the protective coating will remain undamaged.

Some of the types of permanent coatings notably include those based on fluorocarbon chemicals. Fluorinated coatings are some of the most effective in the field of graffiti prevention especially due to hydro- and oil-repellence properties thereof. These coatings also have the added benefit of being chemically inert as well as very durable. Unfortunately, they are also expensive and can be difficult to apply.

The need was thus felt to have available a composition based on cross-linkable ionomeric polyurethanes having a (per)fluoropolyether structure which would enable obtaining coatings endowed with the following properties:
- low VOC (Volatile Organic Compound) content,
- chemical resistance,
- resistance to UV aging and weathering,
- hydro- and oil-repellency,
- stain- and soil-release,
- breathability,
- good adherence to any kind of substrates even after several cleaning cycles,
- excellent anti-graffiti properties,
- to be successfully used for on-site outdoor and indoor applications as being easily cleanable under non-aggressive cleaning conditions.

SUMMARY OF INVENTION

It is thus an object of the present invention an aqueous composition comprising:
(A) at least one functional fluorinated polymer [polymer (F)] selected from:
  a fluorinated ionisable polyurethane polymer [polymer (PUR)] comprising at least one fluorinated block comprising a (per)fluoropolyoxyalkylene chain [chain ($R_{OF}$)] and at least one functional block comprising a hydrocarbon chain [chain ($R_H$)] optionally comprising one or more aromatic or cycloaliphatic groups, said chain ($R_H$) comprising at least one ionisable group, said blocks being linked by urethane moieties having formula (I) here below:

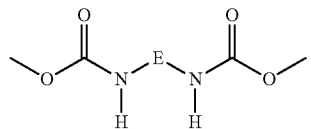

formula (I)

wherein E is a divalent hydrocarbon group, linear or branched, optionally comprising one or more cycloaliphatic or aromatic groups, and a fluorinated polymer [polymer (P)] comprising one or more perfluoroalkyl chains [chain ($R_F$)] linked by one or more ester moieties having formula (II) and/or urethane moieties having formula (III) and/or urea moieties having formula (IV) here below:

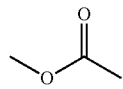

formula (II)

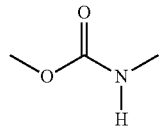

formula (III)

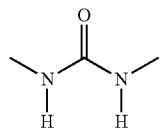

formula (IV)

(B) at least one functional hydrogenated polymer [polymer (H)] different from said polymer (F), said polymer (H) comprising at least one functional group;

(C) at least one cross-linking agent;

wherein the weight ratio of the polymer (F) to the polymer (H) is higher than 0.75.

The Applicant has surprisingly found that the aqueous composition according to the invention advantageously satisfies all the required properties mentioned hereinabove so as to be successfully used as a protective coating.

DETAILED DESCRIPTION OF THE EMBODIMENTS

The chain ($R_{OF}$) of the polymer (PUR) typically comprises one or more repeating units $R^o$, said repeating units $R^o$, randomly distributed along the (per)fluoropolyoxyalkylene chain, being selected from the group consisting of:

(i) —CFXO—, wherein X is F or $CF_3$,
(ii) —$CF_2$CFXO—, wherein X is F or $CF_3$,
(iii) —$CF_2CF_2CF_2$O—.

The chain ($R_{OF}$) is preferably a (per)fluoropolyoxyalkylene chain comprising one or more repeating units $R^{o1}$, said repeating units $R^{o1}$, randomly distributed along the (per)fluoropolyoxyalkylene chain, being selected from the group consisting of:

(i) —$CF_2$O—,
(ii) —$CF_2CF_2$O—.

The molar ratio between recurring units $R^{o1}$ of type (ii) and recurring units of type (i) ranges advantageously from 0.1 to 10, preferably from 0.5 to 5.

The chain ($R_{OF}$) advantageously comprises terminal bridging groups bound to the urethane moiety of formula —$CF_2CH_2(OCH_2CH_2)_{s'}$—, wherein s', equal or different at each occurrence, is an integer comprised between 0 and 5.

For the avoidance of doubt, the above mentioned terminal bridging groups between the chain ($R_{OF}$) and the urethane moiety are bound as depicted in the following scheme:

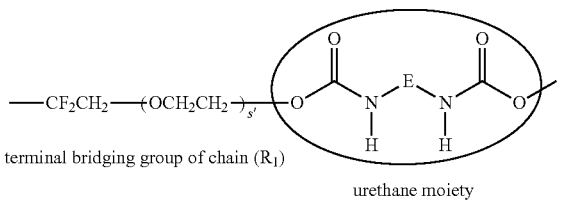

terminal bridging group of chain ($R_1$)    urethane moiety

The chain ($R_H$) of the polymer (PUR) generally has from 2 to 14 carbon atoms.

The chain ($R_H$) comprises at least one ionisable group, i.e. a group yielding a cationic or an anionic group in appropriate pH conditions. Among suitable ionisable groups mention can be notably made of sulphonic acid groups of formula —$SO_3H$, carboxylic acid groups of formula —COOH and of amine groups, either comprised in chain ($R_H$) backbone of formula —N($R_N$)—, wherein $R_N$ is selected from H and hydrocarbon groups having 1 to 6 carbon atoms, or comprised in side groups as —N($R_{N1}$)($R_{N2}$), wherein $R_{N1}$ and $R_{N2}$, equal to or different from each other, are independently selected from H and hydrocarbon groups having 1 to 6 carbon atoms.

The chain ($R_H$) is preferably selected from:

(j) carboxylic-containing chain ($R'_{HC}$) of formula:

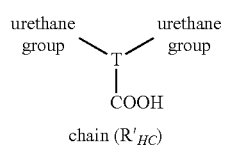

chain ($R'_{HC}$)

wherein T is an hydrocarbon trivalent group, linear or branched, cyclic or not, aliphatic or aromatic, comprising from 2 to 12 carbon atoms; chain ($R'_{HC}$) of formula -T(COOH)— is preferably selected from the followings:

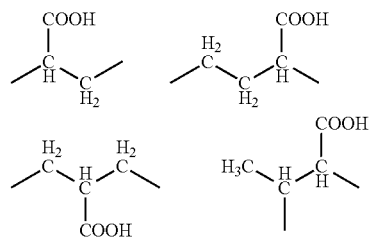

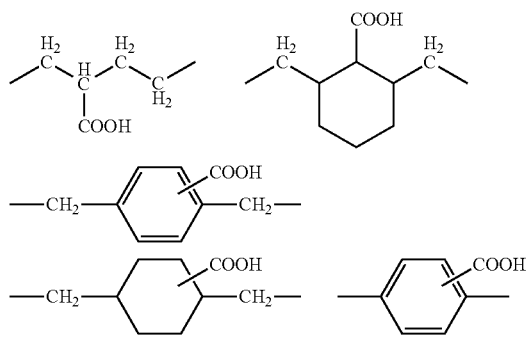

(jj) amine-containing chain ($R''_{HC}$) of formula:

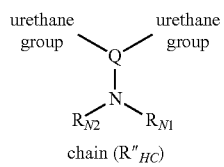

wherein $R_{N1}$ and $R_{N2}$ have the meanings as defined above, Q is an hydrocarbon trivalent group, linear or branched, cyclic or not, aliphatic or aromatic, comprising from 2 to 12 carbon atoms; chain ($R''_{HC}$) of formula $-Q[N(R_{N1})(R_{N2})]-$ preferably complies with formula here below:

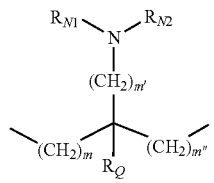

wherein $R_{N1}$ and $R_{N2}$ have the meanings as defined above, preferably $R_{N1}$ and $R_{N2}$ being independently selected from $C_1$-$C_4$ alkyl groups, linear or branched; m, m' and m" are integers from 0 to 4, with the proviso that at least one of m and m" is greater than zero; $R_Q$ being H or a $C_1$-$C_4$ alkyl group, linear or branched. Preferred amine-containing chain ($R''_{HC}$) are those of formulae $-CH(CH_2-N(C_2H_5)_2)-CH_2-$ and/or $-CH(CH_2-N(CH_3)_2)-CH_2-$;

(jjj) amine-containing chain ($R'''_{HC}$) of formula:

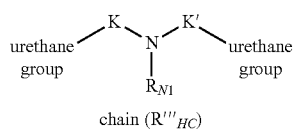

wherein $R_{N1}$ has the meaning as defined above, preferably $R_{N1}$ being selected from $C_1$-$C_4$ alkyl groups; K and K' being divalent hydrocarbon groups having 1 to 6 carbon atoms.

The divalent hydrocarbon group E is notably selected from:

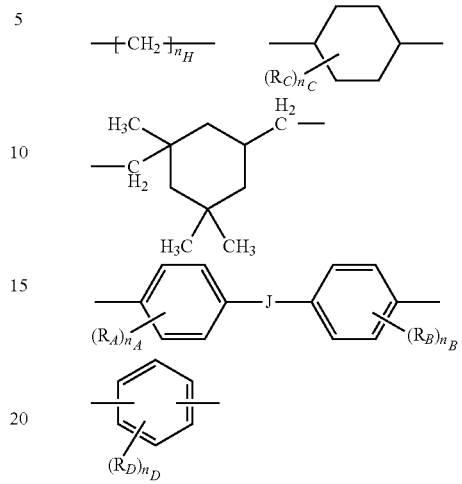

and mixtures thereof;

wherein:

$n_H$ is an integer from 1 to 12, preferably equal to 6;

J is a divalent bridging group selected from: a single bond; a methylene group ($-CH_2-$); an oxygen atom ($-O-$); a $-C(CH_3)_2-$ group; a $-C(CF_3)_2-$ group; a $-SO_2-$ group; a $-C(O)-$ group; preferably J is a methylene group; each of $R_A$, $R_B$, $R_C$ and $R_D$, equal or different at each occurrence, is independently a halogen atom (e.g. Cl, Br, F), a $C_1$-$C_6$ hydrocarbon group (e.g. methyl, ethyl), a substituent group like notably $-OR_H$, $-NR_HR_{H'''}$, $-C(O)-R_{H''}$, wherein $R_H$, $R_{H'}$, $R_{H''}$ and $R_{H'''}$, equal to or different from each other, are independently at each occurrence a hydrogen atom or a $C_1$-$C_6$ hydrocarbon group;

$n_A$, $n_B$ and $n_D$ are independently integers comprised between 0 and 4;

$n_C$ is an integer comprised between 0 and 10.

The polymer (PUR) of the aqueous composition of the invention can be notably produced by reacting at least one hydroxyl-terminated perfluoropolyoxyalkylene complying with formula (V) here below:

$$Z-O-R_{OF}-Y \qquad \text{formula (V)}$$

wherein:

$R_{OF}$ has the same meaning as defined above,

Z and Y, equal to or different from each other, are independently functional hydroxyl groups complying with formula $-CF_2CH_2O(CH_2CH_2O)_{s'}H$, wherein s', equal or different at each occurrence, is an integer comprised between 0 and 5, and at least one functionalized diol of formula HO$-R_H-$OH comprising at least one ionisable group, wherein $R_H$ has the same meaning as defined above, with at least one diisocyanate of formula OCN-E-NCO, wherein E has the same meaning as defined above, and optionally, one or more chain extenders with a molecular weight of 60 to 450 g/mol selected from diols of formula HO$-R_{diol}-$OH and/or diamines of formula $H_2N-R_{diamine}-NH_2$, wherein $R_{diol}$ and $R_{diamine}$ are $C_2$-$C_{14}$ hydrocarbon groups, optionally containing additional functional groups.

The hydroxyl-terminated perfluoropolyoxyalkylenes of formula (V) here above can be prepared starting from the corresponding (per)fluoropolyoxyalkylenes having $-COF$ end groups as taught in GB 1104482 (MONTEDISON SPA)

Feb. 28, 1968, U.S. Pat. No. 3,715,378 (MONTEDISON SPA) Feb. 6, 1973, U.S. Pat. No. 3,242,218 (DUPONT) Mar. 22, 1966, EP 239123 A (AUSIMONT S.P.A.) Sep. 30, 1987, U.S. Pat. No. 5,149,842 (AUSIMONT SRL (IT)) Sep. 22, 1992, U.S. Pat. No. 5,258,110 (AUSIMONT SRL (IT)) Feb. 11, 1993.

The diisocyanates of formula OCN-E-NCO are preferably selected from the followings: hexamethylendiisocyanate (HDI), trimethylhexamethylenediisocyanate, isophoron diisocyanate (IPDI), 4,4'-methylenebis(cyclohexylisocyanate) (H12-MDI), cyclohexyl-1,4-diisocyanate, 4,4'-methylenebis(phenylisocyanate) (MDI) or its isomers, toluene 2,4-diisocyanate (TDI) or isomers thereof, xylylene diisocyanate, naphthalene-1,5-diisocyanate, p-phenylen-diisocyanate.

The chain extender is preferably selected from an aliphatic diol or a (cyclo)aliphatic diamine with 2 to 14 carbon atoms. Non-limitative examples of suitable aliphatic diols notably include ethanediol, 1,4-butanediol, 1,6-hexanediol, diethylene glycol and dipropylene glycol. Non-limitative examples of suitable (cyclo)aliphatic diamines notably include isophoronediamine, ethylene diamine, 1,2-propylenediamine, 1,3-propylenediamine, N-methyl-propylene-1,3-diamine and N,N'-dimethylethylenediamine.

The chain extender may also be selected from diamines comprising a siloxane group of formula:

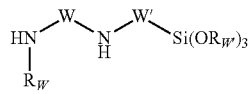

wherein:
$R_w$ and $R_{w'}$, equal to or different from each other, are independently selected from hydrogen and/or $C_1$-$C_6$ hydrocarbon groups, preferably $R_w$ being hydrogen and $R_{w'}$ being selected from $C_1$-$C_6$ hydrocarbon groups,
W and W', equal to or different from each other, represent divalent hydrocarbon group having 1 to 12 carbon atoms.

Diamines comprising a siloxane group suitable for the purpose of the invention are notably those disclosed in EP 1559733 A (SOLVAY SOLEXIS SPA) Mar. 8, 2005. Non-limitative examples of siloxane-comprising diamines are notably N-(2-aminoethyl)-3-aminopropyltrimethoxysilane of formula: $H_2N-(CH_2)_2-NH-(CH_2)_3-Si(OCH_3)_3$, N-(2-aminoethyl)-2-aminoethyltrimethoxysilane of formula: $H_2N-(CH_2)_2-NH-(CH_2)_2-Si(OCH_3)_3$, N-(3-aminopropyl)-3-aminopropyltrimethoxysilane of formula: $H_2N-(CH_2)_3-NH-(CH_2)_3-Si(OCH_3)_3$.

The chain extender is more preferably 1,4-butanediol.

The chain ($R_F$) of the polymer (P) may be part of the polymer (P) backbone or may be present as a pendant side chain.

The term "perfluoroalkyl chain [chain ($R_F$)]" is intended to denote an alkyl chain, free notably from ether linkage, wherein valence of carbon atoms comprised therein are saturated with fluorine atoms. The chain ($R_F$) typically comprises from 4 to 20 carbon atoms; nevertheless, best performances are obtained when the chain ($R_F$) comprises from 4 to 8 carbon atoms. Polymers (P) comprising chains ($R_F$) having an average number of carbon atoms of about 8 to about 10 are more particularly preferred.

The polymer (P) preferably comprises one or more perfluoroalkyl chains [chain ($R_F$)] as defined above linked by one or more ester moieties having formula (II) and/or urethane moieties having formula (III) as described above.

The polymer (P) more preferably comprises one or more chains ($R_F$) linked by one or more ester moieties having formula (II) as described above.

The polymer (P) is even more preferably selected from fluorinated (meth)acrylic polymers comprising recurring units derived from at least one (meth)acrylic monomer [monomer (MA)] comprising a $C_3$-$C_{30}$ perfluoroalkyl chain, said monomer (MA) typically complying with formula here below:

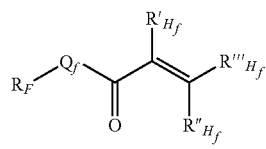

wherein:
$Q_f$ is an oxygen atom or a divalent hydrocarbon group having from 1 to 12 carbon atoms and containing one or more oxygen atoms and, optionally, one or more nitrogen and/or sulphur atoms; suitable Q radicals include —O—, —SO$_2$—N(R*$_{Hf}$)—, —CH$_2$—O—, —C$_2$H$_4$—O—, —C$_4$H$_8$—O—, —C$_6$H$_4$—O—, —CH$_2$C$_6$H$_4$CH$_2$—O—, —C$_2$H$_4$—S—C$_2$H$_4$—O—, —C$_2$H$_4$OC$_4$H$_8$—O—, —CH$_2$OC$_2$H$_4$—O—, —SO$_2$N(R*$_{Hf}$)—C$_2$H$_4$—O—, —CON(R*$_{Hf}$)C$_2$H$_4$—O—, —C$_3$H$_6$CON(R*$_{Hf}$)C$_2$H$_4$—O—, —C$_2$H$_4$—N(R*$_{Hf}$)C$_2$H$_4$—O—, —COOCH$_2$C(CH$_3$)$_2$CH$_2$—O—, —SO$_2$—N(R*$_{Hf}$)—CH$_2$CH(CH$_3$)—O—, and —C$_2$H$_4$SO$_2$N(R*$_{Hf}$)C$_4$H$_8$—O—, wherein R*$_{Hf}$ is H or a $C_1$-$C_4$ alkyl group; preferably, Q is —C$_2$H$_4$—O— or —SO$_2$—N(R*$_{Hf}$)C$_2$H$_4$—O—;
R'$_{Hf}$, R''$_{Hf}$, R'''$_{Hf}$ equal to or different from each other, are independently H or a $C_1$-$C_4$ alkyl group; preferably, R''$_{Hf}$ and R'''$_{Hf}$ are H and R'$_{Hf}$ is H or a methyl group;
$R_F$ has the same meaning as above defined; preferably, $R_F$ is a perfluoroaliphatic group, linear or branched, cyclic or not, comprising 4 to 20 carbon atoms; more preferably, $R_F$ is chosen among: $CF_3(CF_2)_{nf}$—, wherein of is an integer from 3 to 15, preferably from 5 to 11.

Non limitative examples of suitable monomers (MA) notably include the followings: $C_8F_{17}$—$C_2H_4$—O—COCH=CH$_2$, $C_{12}F_{25}$—$C_2H_4$—O—COCH=CH$_2$, 4-$C_2F_6$—$C_6F_{10}$—$C_2H_4$—O—COCH=CH$_2$, $C_6F_{13}$—$C_2H_4$—O—COCH=CH$_2$, $C_5F_{17}$SO$_2$N(CH$_3$)CH$_2$CH$_2$OCOCH=CH$_2$, $C_6F_{13}$—$C_2H_4$—S—$C_8F_{17}$OCOCH=CH$_2$, 4-$C_2F_5$—$C_6F_{10}$—CH$_2$OCOCH=CH$_2$, $C_7F_{15}$—CH$_2$OCOCH=CH$_2$, $C_7F_{15}$—CO—N(CH$_3$)—$C_2H_{40}$COCH=CH$_2$, (CF$_3$)$_2$CF(CF$_2$)$_6$CH$_2$CH$_2$OCOCH=CH$_2$, $C_8F_{17}$—$C_2H_4$—SO$_2$—N($C_3H_7$)$C_2H_{40}$COCH=CH$_2$, $C_7F_{15}$—$C_2H_4$—CONH—$C_4H_8$—OCOCH=CH$_2$, $C_5F_{17}$SO$_2$N($C_2H_5$)—$C_4H_5$—OCOCH=CH$_2$, $C_5F_{17}$—SO$_2$—N($C_3H_7$)—COCH=CH$_2$, $C_{12}F_{25}$—SO$_2$—N($C_3H_7$)—COCH=CH$_2$, 4-$C_2F_5$—$C_6F_{10}$—SO$_2$—N($C_3H_7$)—COCH=CH$_2$.

The polymer (P) generally comprises recurring units derived from additional monomers different from monomer (MA) as defined above; non-limitative examples of monomers copolymerizable with monomer (MA) in said polymer (P) notably include ethylene, vinyl acetate, vinyl chloride, vinyl fluoride, vinylidene chloride, vinylidene fluoride, vinyl chloroacetate, acrylonitrile, vinylidene cyanide, styrene, alkylated styrenes, halogenated styrenes, alkyl, hydroxyalkyl and epoxyalkyl esters of acrylic acid, methacrylic acid and chloroacrylic acid, N-alkyl and N-hydroxyalkyl amides of acrylic acid, methacrylic acid and chloroacrylic acid, methacrylonitrile, vinylcarbazole, vinyl pyrrolidone, vinyl pyridine, vinyl alkyl ethers, vinylalkyl ketones, butadiene, chloroprene, fluoroprene and isoprene.

It is nevertheless understood that the polymer (P) generally comprises at least 50% by weight of recurring units derived from monomer (MA).

Fluorinated (meth)acrylic polymers useful as component (A) of the composition of the invention are notably those described in U.S. Pat. No. 2,803,615 (3M COMPANY) Aug. 20, 1957, U.S. Pat. No. 2,995,542 (3M COMPANY) Aug. 8, 1961, U.S. Pat. No. 3,356,628 (3M COMPANY) Dec. 5, 1967, U.S. Pat. No. 4,525,423 (3M COMPANY) Jun. 25, 1985, U.S. Pat. No. 4,529,658 (3M COMPANY) Jul. 16, 1985, whose disclosures are herein incorporated by reference.

Non-limitative examples of suitable fluorinated (meth) acrylic polymers notably include those commercially available under the trademark name SCOTCHGUARD® from 3M company and UNIDYNE® from Daikin.

The polymer (F) of the aqueous composition of the invention is preferably a polymer (PUR) as defined above.

The aqueous composition of the invention advantageously comprises at least 3% by weight, preferably at least 10% by weight of component (A) as defined above, with respect to the total weight of the composition.

The composition of the invention advantageously comprises at most 25% by weight, preferably at most 20% by weight of component (A) as defined above, with respect to the total weight of the composition.

The functional group of the polymer (H) may be part of the polymer (H) backbone, thus being an intra-chain functional group, or may be present as a pendant side-chain functional group.

The functional group of the polymer (H) is typically selected from carboxylic acid groups and derivatives thereof, urethane groups, hydroxyl groups, amine groups and thiol groups.

The polymer (H) may be a polyaddition polymer [polymer $(H_a)$] or a polycondensation polymer [polymer $(H_b)$].

The polymer $(H_a)$ typically comprises repeating units $R^1$, said repeating units $R^1$, randomly distributed along the polymer $(H_a)$ backbone, being derived from linear or branched $C_2$-$C_{30}$ hydrogenated unsaturated monomers, optionally comprising one or more oxygen atoms and/or halogen atoms and/or aromatic groups, at least one of said monomers comprising at least one functional group as defined above.

The polymer $(H_b)$ typically comprises repeating units $R^2$, said repeating units $R^2$, randomly distributed along the polymer $(H_b)$ backbone, being derived from linear or branched $C_1$-$C_{30}$ hydrogenated monomers, saturated or unsaturated, optionally comprising one or more oxygen atoms and/or halogen atoms and/or aromatic groups, said monomers comprising at least two reactive groups, equal to or different from each other, at least two of said reactive groups on the same monomer or on different monomers as defined above being different from each other and being able to react with each other to yield a functional group as defined above.

The polymer (H) is preferably free of fluorine atoms.

The polymer (H) is more preferably selected from polyacrylic, polyurethane and polyvinylalcohol polymers and mixtures thereof. Most preferred polymers (H) are polyacrylic and polyurethane polymers.

The composition of the invention advantageously comprises at least 1% by weight, preferably at least 2% by weight of component (B) as defined above, with respect to the total weight of the composition.

The composition of the invention advantageously comprises at most 15% by weight, preferably at most 10% by weight of component (B) as defined above, with respect to the total weight of the composition.

The weight ratio of the polymer (F) to the polymer (H) in the aqueous composition of the invention is preferably higher than 1.0, more preferably higher than 1.5.

The Applicant has surprisingly found that an aqueous composition as defined above having a weight ratio of the polymer (F) to the polymer (H) equal to or lower than 0.75 does not exhibit all the required properties to be successfully used as a coating, in particular satisfactory anti-graffiti properties coupled with good adhesion properties.

The cross-linking agent suitable for the purpose of the invention is not particularly restricted provided that it comprises at least two groups able to react with the terminal and/or pendant reactive groups of the polymer (F) and with the functional groups of the polymer (H). It is also possible to use a mixture of different cross-linking agents able to react with different reactive groups of the polymer (F) and with the functional groups of the polymer (H).

Non-limitative examples of suitable cross-linking agents notably include polyaziridines, polyalkoxysilanes, polyisocyanates, blocked polyisocyanates, melamine formaldehydes and derivatives, epoxides, anhydrides and derivatives thereof.

The cross-linking agent is preferably selected from polyaziridines and polyalkoxysilanes. More preferred cross-linking agents are polyaziridines.

The composition of the invention advantageously comprises at least 1% by weight, preferably at least 3% by weight of component (C) as defined above, with respect to the total weight of the composition.

The composition of the invention advantageously comprises at most 15% wt, preferably at most 10% by weight of component (C) as defined above, with respect to the total weight of the composition.

The components (A), (B) and (C) of the aqueous composition of the invention are totally or partially suspended and/or at least partially solubilised in water.

Aqueous compositions according to the present invention which were found to give particularly good results in terms of both anti-graffiti and adhesion properties, coupled with outstanding durability, are those comprising:

at least one polymer (PUR) in an amount of from 10% to 20% by weight, with respect to the total weight of the composition;

at least one polymer (H) different from said polymer (PUR) in an amount of from 2% to 10% by weight, with respect to the total weight of the composition;

at least one cross-linking agent in an amount of from 3% to 10% by weight, with respect to the total weight of the composition;

water in an amount of from 50% to 85% by weight, preferably of from 55% to 80% by weight, with respect to the total weight of the composition;

wherein the weight ratio of the polymer (PUR) to the polymer (H) is higher than 0.75.

The Applicant has found that the aqueous composition of the invention has advantageously a high pot-life, typically 12 hours, to be successfully used for the required time.

The aqueous composition of the invention may also comprise, in addition to components (A), (B) and (C) as defined above, other ingredients, such as, notably, rheological additives, catalysts, UV absorbers, organic and inorganic pigments, fillers, antifoam agents and the like. The skilled in the art will select such additional ingredients and the amounts thereof as a function of the use of said composition.

The aqueous composition of the invention preferably further comprises, in addition to components (A), (B) and (C) as defined above, one or more rheological additives, one or more catalysts and one or more UV absorbers. If present, one or more rheological additives are comprised therein in an amount of from 0.5% to 5% by weight, preferably of from 1% to 3% by weight, with respect to the total weight of the composition.

The aqueous composition of the invention is preferably a varnish or a paint, the paint further comprising, in addition to components (A), (B) and (C) as defined above, one or more organic and/or inorganic pigments.

Another object of the invention is a process for the manufacture of the aqueous composition as defined above.

The process of the invention advantageously comprises mixing aqueous solutions and/or dispersions of components (A), (B) and (C) as defined above. The process is carried out typically at room temperature.

According to a preferred embodiment of the process of the invention, the addition of an aqueous solution and/or dispersion of component (C), optionally in the presence of one or more catalysts, UV absorbers and antifoam agents mentioned above, to an aqueous solution and/or dispersion of components (A) and (B), optionally in the presence of one or more rheological additives, organic and/or inorganic pigments and fillers mentioned above, typically takes place at the time of use of the aqueous composition of the invention.

Still another object of the invention is use of the aqueous composition as defined above for coating a substrate.

Substrates of different typologies may advantageously be coated with the aqueous composition of the invention such as surfaces of concretes, stones such as natural and composite stones, metals, plastics, rubbers, glasses, woods.

The aqueous compositions of the invention may advantageously be used in different application fields, in particular for on-site applications, for example in the architectural field, wherein interior and exterior surfaces of buildings need to be protected against aggressive atmospheric pollutants, extreme weather conditions and graffiti markings while being environmentally friendly, breathable and easily cleanable.

Depending on the application, the aqueous composition of the invention may be used as a varnish or a paint as defined above.

The aqueous composition of the invention is applied to the substrate typically by spraying, roller, brush or putty-knife methods.

After the aqueous composition of the invention is applied to the substrate, a cross-linking reaction takes place at temperatures typically ranging from 5° C. to 200° C., preferably from 10° C. to 150° C. When the cross-linking agent of the invention is selected from polyaziridines and polyalkoxysilanes, the cross-linking reaction advantageously takes place at room temperature.

The invention also pertains to coated substrates obtained by coating a substrate as defined above with the aqueous composition of the invention.

The Applicant has found that it is advantageously possible to obtain coatings having both excellent adhesion to the substrate even after several cleaning cycles and excellent anti-graffiti properties, so that a long-term performance is achieved due also to their outstanding resistance to degradation, hydro- and oil-repellency, stain- and soil-release properties and permeability to air and water vapour.

Should the disclosure of any patents, patent applications, and publications which are incorporated herein by reference conflict with the description of the present application to the extent that it may render a term unclear, the present description shall take precedence.

EXAMPLES

The invention will be now described in more detail with reference to the following examples, whose purpose is merely illustrative and not limiting the scope of the invention.

Test Methods

Adhesion Tests

The adhesion properties were measured according to the procedure as detailed in ASTM D3359-09.

Anti-Graffiti Tests

The anti-graffiti properties were measured according to the procedure as detailed in ASTM D6578-08.

Synthesis of Polymers (PUR)

Example 1

Synthesis of Polymer (PUR-1)

Following the teachings of EP 1369442 A (AUSIMONT S.P.A.) Dec. 10, 2003, an anionic polyurethane was synthesized reacting:

507 g of FLUOROLINK® DION perfluoropolyether diol having a hydroxyl equivalent weight of 760 (666 meq.);

148 g of isophorone diisocyanate (1333 meq.); and 46 g of dimethylpropionic acid (671 meq.) salified with 27 g of thriethylamine (267 meq.).

An aqueous dispersion with a solid content, determined as dry residue, of 25% by weight of polymer (PUR-1) having an anionic group was obtained.

Preparation of the Compositions

General Procedure

A composition was prepared by mixing the aqueous dispersion of polymer (PUR-1) of the Example 1 of the invention with an aqueous dispersion with a solid content, determined as dry residue, of 50% by weight of a polymer (H) selected from polyacrylic and polyurethane polymers and a cross-linker composition, said cross-linker composition containing the following ingredients:

50% by weight of polyaziridine cross-linking agent;
21% by weight of ethyl acetate;
22% by weight of methylethylketone;
1% by weight of isopropyl alcohol;
2% by weight of dibutyl tin dilaurate;
2% by weight of a UV absorber;
2% by weight of a silicon defoamer.

A solution of a modified urea as rheological additive in an amount of 1.6% by weight with respect to the total weight of the composition is also added thereto.

The main components of the aqueous compositions so obtained, wherein water is the complement to 100% by weight, are summarized in Table 1 here below:

TABLE 1

| Run | Polymer (PUR-1) dispersion | Polymer (H) dispersion | Cross-linker composition | Polymers (PUR-1):(H) weight ratio |
| --- | --- | --- | --- | --- |
| Example 2 | 60.9% wt. | 8.7% wt. | 13.0% wt. | 3.50:1 |
| Example 3 | 60.9% wt. | 17.4% wt. | 13.0% wt. | 1.75:1 |
| Comparative Example 4 | 26.1% wt. | 17.4% wt. | 13.0% wt. | 0.75:1 |

Application of the Compositions

The aqueous compositions as reported in Table 1 here above were applied by spray coating on Q-panel aluminium paint test panels. The thickness and the adhesion properties of the coatings so obtained were evaluated (see Table 2 here below).

TABLE 2

| Run | Drying time [minutes] | Thickness [μm] | Adhesion [% area removed] |
|---|---|---|---|
| Example 2 | 40 | 50 ± 10 | 0% |
| Example 3 | 40 | 51 ± 8 | 0% |
| Comparative Example 4 | 40 | 36 ± 4 | <5% |

After 24 hours, the anti-graffiti properties of said coatings were also determined according to the procedure as detailed in ASTM D6578-08 modified by contacting the test panels during 15 minutes with BIOSVERNIMAX® paint remover product available from MaxMeyer (see Table 3 here below).

TABLE 3

|  | Example 2 | Example 3 | Comparative Example 4 |
|---|---|---|---|
| Modified ASTM D6578-08 | 1° cleaning 7.3 | 1° cleaning 7.5 | 1° cleaning 4.3 not cleanable (gloss loss) |
|  | 2° cleaning 6.8 | 2° cleaning 6.5 | 2° cleaning — |

As it can be seen from Tables 2 and 3 here above, the aqueous compositions of Examples 2 and 3 of the invention applied to Q-panel aluminium paint test panels as specified here above exhibited satisfactory adhesion and anti-graffiti properties as compared with the aqueous composition of comparative Example 4.

The aqueous composition of comparative Example 4 was found not to be cleanable according to ASTM D6578-08 modified as detailed hereinabove so that a second cleaning procedure did not apply there.

The rate numbers reported in Table 3 here above are indicators of the anti-graffiti properties of said coatings: the effectiveness of removal of graffiti markings increases by increasing the rate number by 5 to 10, whereas not cleanable graffiti markings are indicated by a rate number ranging from 1 to 4. It is essential that rate numbers are equal to or higher than 6 in order to have satisfactory anti-graffiti properties, which advantageously enable achieving a faster removal of graffiti markings under non-aggressive cleaning conditions.

The invention claimed is:

1. An aqueous composition comprising:
(A) 3-25 wt %, with respect to the total weight of the composition, of at least one functional fluorinated polymer [polymer (F)] selected from the group consisting of:
  fluorinated ionisable polyurethane polymers [polymer (PUR)] comprising:
    at least one fluorinated block comprising a (per)fluoropolyoxyalkylene chain [chain $(R_{OF})$], wherein chain $(R_{OF})$ comprises one or more repeating units R, said repeating units R, randomly distributed along the (per)fluoropolyoxyalkylene chain, being selected from the group consisting of:
      (i) —CFXO—, wherein X is F or $CF_3$,
      (ii) —$CF_2$CFXO—, wherein X is F or $CF_3$, and
      (iii) —$CF_2CF_2CF_2O$—; and
    at least one functional block comprising a hydrocarbon chain [chain $(R_H)$], wherein chain $(R_H)$ is selected from the group consisting of carboxylic-containing chains $(R'_{HC})$ of formula:

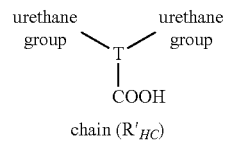

chain $(R'_{HC})$ wherein T is a trivalent hydrocarbon, linear or branched, cyclic or not, aliphatic or aromatic, comprising from 2 to 12 carbon atoms,
    said at least one functional block being linked by urethane moieties having formula (I):

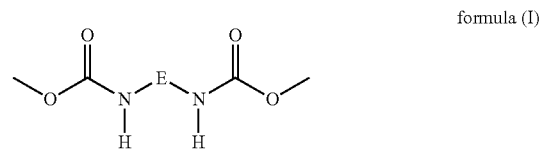

formula (I)

wherein E is a divalent hydrocarbon group selected from the group consisting of:

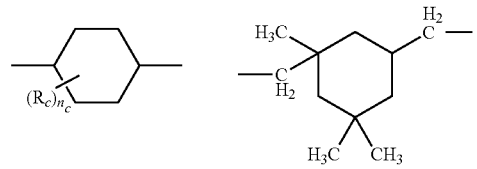

and mixtures thereof;
    wherein:
      $R_C$, equal or different at each occurrence, is independently selected from a halogen atom, a $C_1$-$C_6$ hydrocarbon group, —$OR_H$, —$NR_{H'}R_{H''}$, and —C(O)—$R_{H'''}$, wherein $R_H$, $R_{H'}$, $R_{H''}$ and $R_{H'''}$, equal to or different from each other, are independently at each occurrence selected from a hydrogen atom or a $C_1$-$C_6$ hydrocarbon group; and
      $n_C$ is an integer comprised between 0 and 10,
(B) 1-15 wt %, with respect to the total weight of the composition, of at least one functional hydrogenated polymer [polymer (H)] selected from the group consisting of polyacrylic polymers, polyurethane polymers and mixtures thereof, said polymer (H) comprising at least one functional group; and
(C) 1-15 wt %, with respect to the total weight of the composition, of at least one cross-linking agent selected from polyaziridine cross-linking agents;
wherein the weight ratio of the polymer (F) to the polymer (H) is greater than 0.75.

2. The aqueous composition of claim 1, wherein chain $(R_{OF})$ comprises one or more repeating units R, said repeating units R, randomly distributed along the (per)fluoropolyoxyalkylene chain, being selected from the group consisting of:

(i) —CF$_2$O— and (ii) —CF$_2$CF$_2$O—.

3. The aqueous composition of claim 2 wherein the molar ratio of recurring units of type (ii) and recurring units of type (i) ranges from 0.1 to 10.

4. The aqueous composition of claim 1, wherein -T(COOH)— is selected from:

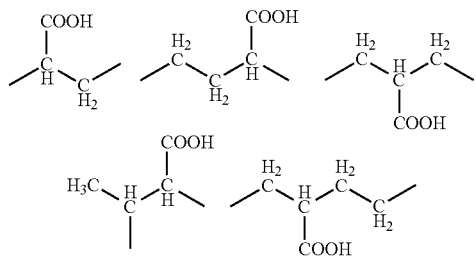

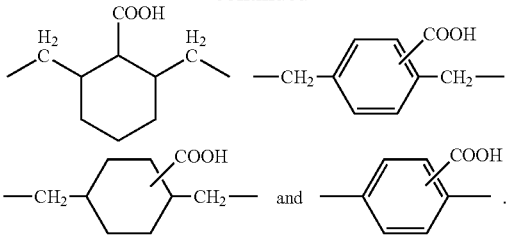

5. A process for the manufacture of the aqueous composition of claim 1.

6. A method of coating a substrate comprising contacting the substrate with the aqueous composition of claim 1.

7. The method according to claim 6, wherein the aqueous composition is a varnish or a paint.

8. A substrate coated with the aqueous composition of claim 1.

* * * * *